US010457540B2

(12) United States Patent
Martensson et al.

(10) Patent No.: US 10,457,540 B2
(45) Date of Patent: *Oct. 29, 2019

(54) KIT OF PARTS FOR ASSEMBLING A HOSE CONNECTION, A FUEL DISPENSING UNIT HAVING SUCH A HOSE CONNECTION, AND A METHOD FOR ASSEMBLING SUCH A HOSE CONNECTION

(71) Applicant: Wayne Fueling Systems Sweden AB, Malmo (SE)

(72) Inventors: Mattias G. Martensson, Kavlinge (SE); Lars Andersson, Malmo (SE); James Dirocco, Jr., Hutto, TX (US)

(73) Assignee: Wayne Fueling Systems Sweden AB, Malmö (SE)

( * ) Notice: Subject to any disclaimer, the term of this patent is extended or adjusted under 35 U.S.C. 154(b) by 71 days.

This patent is subject to a terminal disclaimer.

(21) Appl. No.: 15/617,175

(22) Filed: Jun. 8, 2017

(65) Prior Publication Data
US 2017/0268710 A1    Sep. 21, 2017

Related U.S. Application Data

(63) Continuation of application No. 13/809,403, filed as application No. PCT/EP2010/059923 on Jul. 9, 2010, now Pat. No. 9,702,493.

(51) Int. Cl.
*F16L 41/00* (2006.01)
*B67D 7/74* (2010.01)
(Continued)

(52) U.S. Cl.
CPC ............. *B67D 7/74* (2013.01); *B67D 7/04* (2013.01); *B67D 7/0478* (2013.01); *B67D 7/38* (2013.01);
(Continued)

(58) Field of Classification Search
CPC ......... F16L 41/03; B67D 7/74; B67D 7/0478; B67D 2007/746
(Continued)

(56) References Cited

U.S. PATENT DOCUMENTS 2,460,622 A    2/1949 Crawley
3,506,029 A    4/1970 Demler et al.
(Continued)

FOREIGN PATENT DOCUMENTS

DE    102008055994 B4    9/2010
EP    0407110 A1    1/1991
(Continued)

OTHER PUBLICATIONS

PCT, International Preliminary Report on Patentability, International Application No. PCT/EP2010/059923; International Filing Date: Jul. 9, 2010, 19 pages.

*Primary Examiner* — David Bochna
(74) *Attorney, Agent, or Firm* — Mintz Levin Cohn Ferris Glovsky and Popeo, P.C.

(57) ABSTRACT

A kit of parts is provided that can include a plurality of hose connection parts selectable from, first hose connection parts comprising one fluid inlet and one fluid outlet, second hose connection parts comprising two fluid inlets and one fluid outlet, and third hose connection parts comprising three fluid inlets and one fluid outlet. The kit of parts can be suitable for assembling a hose connection having at least a first and second fluid inlet and a fluid outlet, according to any one of three configurations. The invention also relates to a fuel dispensing unit for refueling vehicles and a method for assembly a hose connection.

9 Claims, 3 Drawing Sheets

(51) Int. Cl.
  *B67D 7/04*   (2010.01)
  *B67D 7/38*   (2010.01)
  *B67D 7/40*   (2010.01)
  *F16L 41/03*  (2006.01)

(52) U.S. Cl.
  CPC ............... *B67D 7/40* (2013.01); *F16L 41/03* (2013.01); *B67D 2007/746* (2013.01); *Y10T 137/0447* (2015.04)

(58) Field of Classification Search
  USPC ............... 285/125.1, 130.1, 12; 141/45, 285
  See application file for complete search history.

(56) References Cited

U.S. PATENT DOCUMENTS

| | | | |
|---|---|---|---|
| 3,526,419 A | 9/1970 | Saguchi | |
| 4,090,539 A | 5/1978 | Krupp | |
| 4,576,312 A | 3/1986 | Swick, Jr. | |
| 4,649,970 A | 3/1987 | Bower et al. | |
| 4,938,251 A | 7/1990 | Furrow et al. | |
| 5,203,384 A | 4/1993 | Hansen | |
| 5,908,055 A | 6/1999 | Baumann et al. | |
| 6,044,873 A * | 4/2000 | Miller | B67D 7/0478 141/198 |
| 6,085,775 A * | 7/2000 | Smith | B67D 7/74 137/269 |
| 6,547,159 B1 | 4/2003 | Westby | |
| 6,568,713 B1 | 5/2003 | Bruvry et al. | |
| 6,622,757 B2 * | 9/2003 | Hart | B67D 7/0486 141/7 |
| 7,726,698 B2 | 6/2010 | Larsson et al. | |
| 8,333,410 B2 | 12/2012 | Boticki | |
| 8,448,675 B2 * | 5/2013 | Mellone | B67D 7/0478 141/1 |
| 9,702,493 B2 * | 7/2017 | Martensson | B67D 7/74 |
| 2008/0276998 A1 | 11/2008 | Boyher et al. | |

FOREIGN PATENT DOCUMENTS

| | | |
|---|---|---|
| EP | 1125888 A1 | 8/2001 |
| EP | 2196717 A1 | 6/2010 |

* cited by examiner

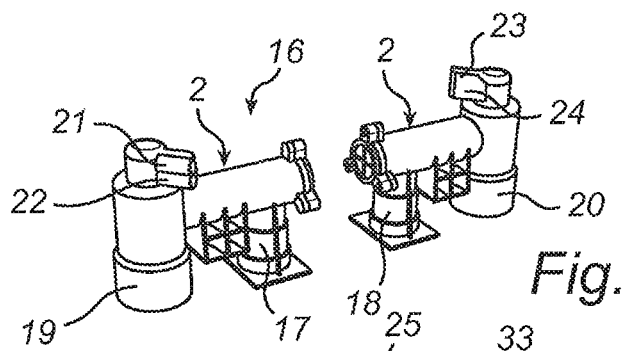
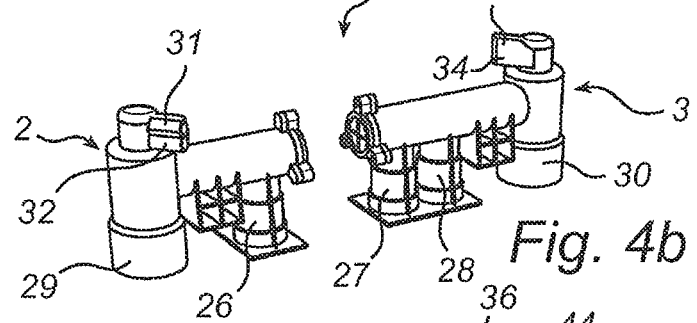
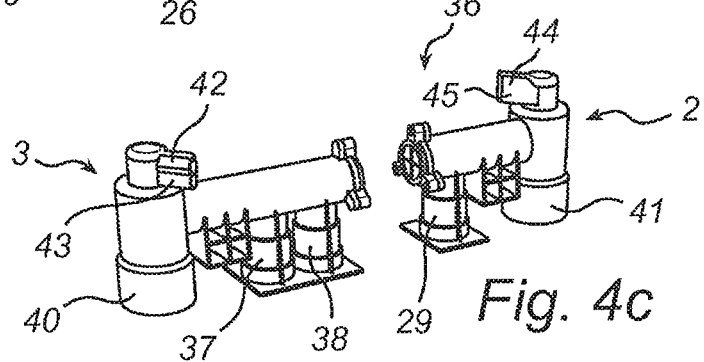
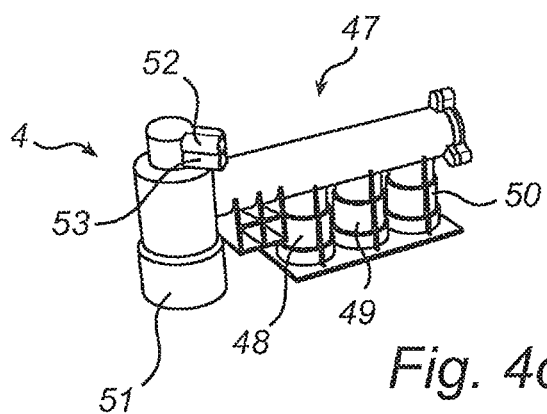
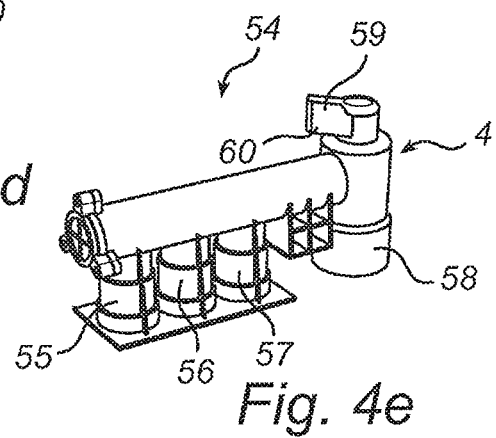

KIT OF PARTS FOR ASSEMBLING A HOSE CONNECTION, A FUEL DISPENSING UNIT HAVING SUCH A HOSE CONNECTION, AND A METHOD FOR ASSEMBLING SUCH A HOSE CONNECTION

CROSS REFERENCE TO RELATED APPLICATIONS

The present application is a continuation of U.S. application Ser. No. 13/809,403, filed Jan. 9, 2013, now U.S. Pat. No. 9,702,493, and entitled "Kit Of Parts for Assembling a Hose Connection, a Fuel Dispensing Unit Having Such a Hose Connection, and a Method for Assembling Such a Hose Connection," which is a '371 of PCT/EP2010/059923, filed on Jul. 9, 2010, and entitled "Kit Of Parts for Assembling a Hose Connection, a Fuel Dispensing Unit Having Such a Hose Connection, and a Method for Assembling Such a Hose Connection," which are hereby incorporated by reference herein in their entireties.

TECHNICAL FIELD

The invention relates to a kit of parts suitable for assembling a hose connection in a fuel dispensing unit for refueling vehicles. The invention also relates to a fuel dispensing unit for refueling vehicles having such a hose connection and a method for assembling such a hose connection.

BACKGROUND ART

A fuel dispensing unit used for filling the fuel tank of a motor vehicle with fuel is a complex device containing a vast number of components connected to each other. The reliability of different components transporting the fuel between an underground reservoir and a fuel tank of the motor vehicle being filled, and the assembly of the same, are of great importance since a leakage in or between any one of these components could be catastrophical.

The hose connection connecting the pipe transporting the fuel from the underground tank with the hose transporting the fuel to the fuel tank of a motor vehicle is such a component.

When filling the fuel tank of a motor vehicle, it is further a common measure to recover the vapour escaping the tank when filling it with liquid fuel. This measure is taken for both safety and environmental reasons. The vapour recovery is achieved, for instance, by arranging a vapour suction nozzle next to the fuel dispensing nozzle of a pistol grip for filling the tank with fuel. Vapour is then removed from the tank during filling, at a certain rate, which is often controlled by the standard rate of at which fuel is dispensed to the tank. Accordingly, since both fuel and potentially fuel vapour travels though the hose connection, the assembly of the components together forming the hose connection is critical.

EP-2,196,717 discloses a hose connection for a fuel dispensing unit. The hose connection comprises a pipe for transporting fuel from a fuel reservoir, a hose for transporting fuel to a motor vehicle, an intermediate member arranged to connect said hose with said pipe, and a locking device fixed to said fuel dispensing unit arranged to interlock said pipe and said intermediate member.

A problem with the above mentioned fuel dispensing unit and other prior art is that the hose connections generally comprise many different components which make the assembly of each hose connection stressing and time consuming for the mechanic performing the operation. The amount of components is increased even further with fuel dispensing units having a plurality of fuel hoses, since a hose connection is needed for each transition between a fuel pipe and a fuel hose in the fuel dispensing unit, respectively.

Further, when several fuel hoses and accordingly several hose connections are provided within the same fuel dispensing unit it is a problem that the assembly of the vapour recovery piping becomes even more complicated and time consuming. In this case, the vapour recovery pipes from all hose connections of each side of the fuel dispensing unit are connected together using several T-joints. This is done, since the common solution is to only use only one vacuum source for all the vapour recovery pipes of each side of the fuel dispensing unit.

Another difficulty with the hose connections available on the market today is that no blending of fuels with varying octane ratings within the hose connection is possible.

SUMMARY OF THE INVENTION

It is an object of the present invention to provide an improvement of the prior art. More particularly, it is an object of the present invention to decrease the number of components in a fuel dispensing unit and to simplify the assembling of the same.

These and other objects as well as advantages that will be apparent from the following description of the present invention are achieved by a kit of parts for assembling a hose connection, a fuel dispensing unit having such a hose connection, and a method for assembling such a hose connection according to the claims below.

Thus, the present invention provides a kit of parts for a fuel dispensing unit, said kit comprising a plurality of hose connection parts selectable from first hose connection parts comprising one fluid inlet and one fluid outlet, second hose connection parts comprising two fluid inlets and one fluid outlet, and third hose connection parts comprising three fluid inlets and one fluid outlet, which kit of parts is suitable for assembling a hose connection having at least a first and second fluid inlet and a first fluid outlet, according to any one of following five configurations:

a first part selected from the first hose connection parts is arranged such that said first fluid inlet is in fluid communication with said first fluid outlet, and a second part selected from the first hose connection parts is arranged such that said second fluid inlet is in fluid communication with a second fluid outlet;

a first part selected from the first hose connection parts is arranged such that said first fluid inlet is in fluid communication with said first fluid outlet, and a second part selected from the second hose connection parts is arranged such that said second fluid inlet and a third fluid inlet is in fluid communication with a second fluid outlet;

a first part selected from the second hose connection parts is arranged such that said first fluid inlet and said second fluid inlet are in fluid communication with said first fluid outlet, and a second part selected from the first hose connection parts is arranged such that a third fluid inlet is in fluid communication with a second fluid outlet;

a first part selected from the third hose connection parts is arranged such that said first, second and a third fluid inlet are in fluid communication with said first fluid outlet;

a first part selected from the third hose connection parts is arranged such that said first, second and a third fluid inlet are in fluid communication with a second fluid outlet.

This is advantageous in that a number of different hose connections for a fuel dispensing unit may be assembled by said kit of parts. By combining the different hose connection parts when assembling the hose connection, it may be varied in order to conform to the fuel dispensing unit in which the hose connection is to be arranged. Since a small number of hose connection parts are used for several different types of hose connections, the overall number of components for a company manufacturing fuel dispensing units carrying the hose connections is reduced. Another advantage is the possibility to blend different types of fuels with varying octane ratings within the hose connection merely by combining the hose connection parts in the different configurations.

The kit of parts may be arranged to be mounted on a support surface of the fuel dispensing unit. Accordingly, the weight of the hose connection will be received by the support surface.

The fluid inlets may be arranged to receive a pipe for transporting fuel, and the fluid outlets may be arranged to receive a hose for transporting fuel. Hence, the hose connection is a solid connection part between the pipe and the hose transporting fuel to e.g. the vehicle to be refueled.

The pipe for transporting fuel may extend in a substantially vertical direction, perpendicular to a surface on which the fuel dispensing unit is placed.

The first, second and third hose connection parts may further comprise at least one vapour recovery port, said at least one vapour recovery port being arranged to receive a vapour recovery pipe. The vapour recovery is then achieved, for instance, by arranging a vapour suction nozzle next to the fuel dispensing nozzle of a pistol grip for filling the tank with fuel. Further, the recovered fuel vapour may be transported through a coaxial hose, via the vapour recovery pipe in the hose connection to the underground reservoir. This measure is taken for both safety and environmental reasons.

The pipe for transporting fuel as well as the vapour recovery pipe may be provided with two annular beads which accommodate an O-ring between themselves. This is advantageous in that a reliable sealing between the vapour recovery pipe and the hose connection parts is achieved.

The kit of parts may be arranged to be mounted in an upper portion of a fuel dispensing unit, thereby creating more free space within the actual housing of the fuel dispensing unit.

According to a second aspect of the invention, the invention relates to a fuel dispensing unit comprising a hose connection assembled with a kit of parts according to the above described features.

According to a third aspect of the invention, the invention relates to a method for assembling a hose connection using a kit of parts according to the above described features.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 4a is a perspective view of a hose connection assembled using the kit of parts shown in FIG. 1 according to a first embodiment of the invention, FIG. 4b is a perspective view of a hose connection assembled using the kit of parts shown in FIG. 1 according to a second embodiment of the invention, FIG. 4c is a perspective view of a hose connection assembled using the kit of parts shown in FIG. 1 according to a third embodiment of the invention, FIG. 4d is a perspective view of a hose connection assembled using the kit of parts shown in FIG. 1 according to a fourth embodiment of the invention, FIG. 4e is a perspective view of a hose connection assembled using the kit of parts shown in FIG. 1 according to a fifth embodiment of the invention.

DETAILED DESCRIPTION OF PREFERRED EMBODIMENTS OF THE INVENTION

Figure 1:
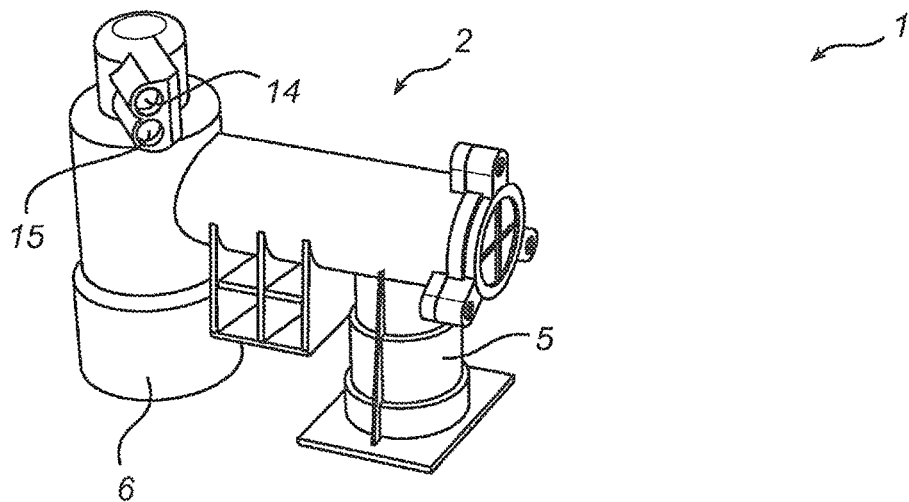
FIGS. 1-3 are perspective views hose connection parts comprised by a kit of parts suitable for assembling a hose connection.
Figure 2:
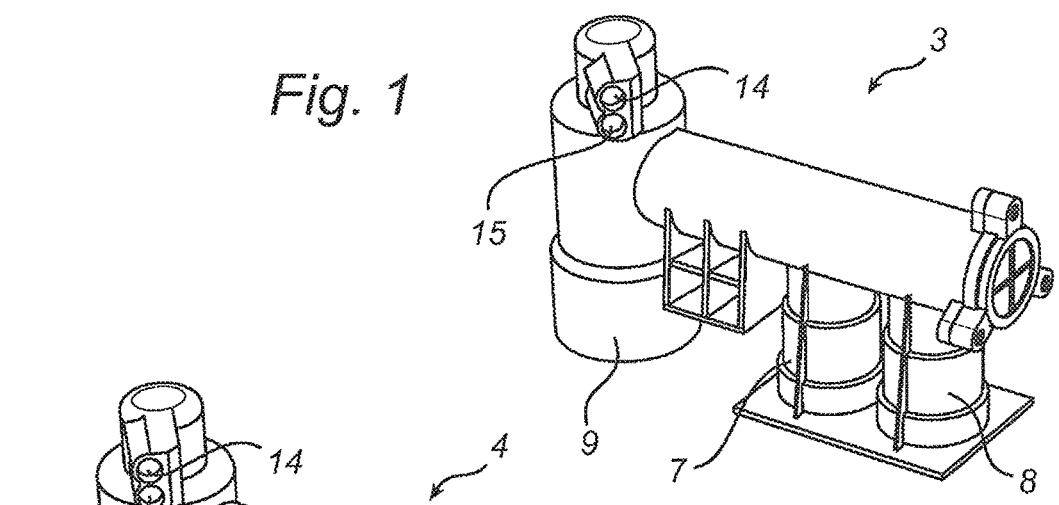
Figure 3:
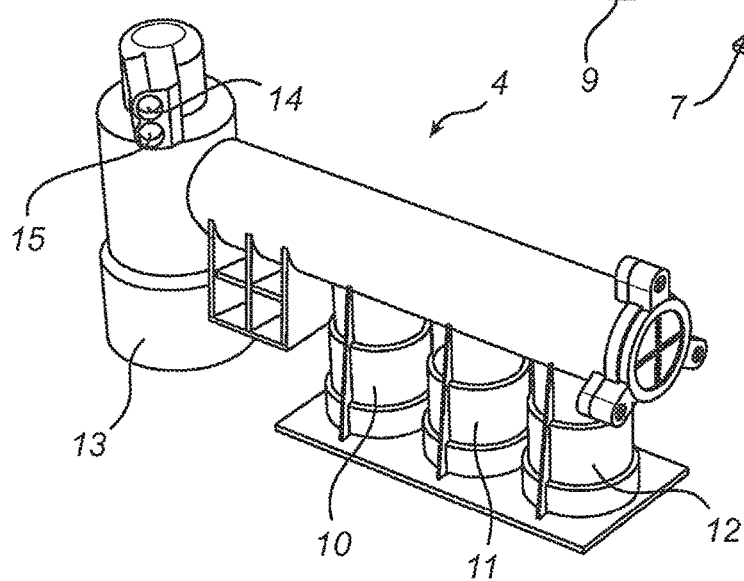

FIGS. 1-3 illustrate a kit of parts 1 for assembling a hose connection for a fuel dispensing unit. The kit of parts 1 comprises first, second and third hose connection parts 2, 3, 4. The first connection parts 2 have one fluid inlet 5 and one fluid outlet 6, the second connection parts 3 have two fluid inlets 7, 8 and one fluid outlet 9, and the third hose connection parts 4 have three fluid inlets 10, 11, 12 and one fluid outlet 13. The fluid inlets 5, 7, 8, 10, 11, 12 are each arranged to receive a pipe for transporting fuel, and the fluid outlets 6, 9, 13 are each arranged to receive a hose for transporting fuel. The hose connection parts 2, 3, 4 have two vapour recovery ports 14, 15, each port 14, 15 being arranged to receive a vapour recovery pipe for transporting fuel vapour. Since each one of the hose connection parts 2, 3, 4 has vapour recovery ports 14, 15, the hose connection is automatically presented with the possibility to recover fuel vapour.

In FIG. 4a, a hose connection 16 assembled using the kit of parts 1 according to a first embodiment of the invention is illustrated. The hose connection 16 has a first and second fluid inlet 17, 18 and a first and second fluid outlet 19, 20. A first part selected from the first hose connection parts 2 is arranged such that the first fluid inlet 17 is in fluid communication with the first fluid outlet 19, and a second part selected from the first hose connection parts 2 is arranged such that the second fluid inlet 18 is in fluid communication with the second fluid outlet 20. Additionally, the hose connection 16 has four vapour recovery ports 21, 22, 23, 24. The fluid inlets 17, 18 are arranged to receive a pipe for transporting fuel, the fluid outlets 19, 20 are arranged to receive a hose for transporting fuel, and the vapour recovery ports 21, 22, 23, 24 are arranged to receive a vapour recovery pipe for transporting fuel vapour.

FIG. 4b illustrates a hose connection 25 assembled using the kit of parts 1 according to a second embodiment of the invention. The hose connection 25 has a first, second and third fluid inlet 26, 27, 28 and a first and second fluid outlet 29, 30. A first part selected from the first hose connection parts 2 is arranged such that the first fluid inlet 26 is in fluid communication with the first fluid outlet 29, and a second part selected from the second hose connection parts 3 is arranged such that the second fluid inlet 27 and the third fluid inlet 28 is in fluid communication with a second fluid outlet 30. Additionally, the hose connection 25 has four vapour recovery ports 31, 32, 33, 34. The fluid inlets 26, 27, 28 are arranged to receive a pipe for transporting fuel, the fluid outlets 29, 30 are arranged to receive a hose for transporting fuel, and the vapour recovery ports 31, 32, 33, 34 are arranged to receive a vapour recovery pipe for transporting fuel vapour.

In FIG. 4c, a hose connection 36 assembled using the kit of parts 1 according to a third embodiment of the invention is illustrated. The hose connection 36 has a first, second and third fluid inlet 37, 38, 39 and a first and second fluid outlet 40, 41. A first part selected from the second hose connection parts 3 is arranged such that the first fluid inlet 37 and the second fluid inlet 38 are in fluid communication with the first fluid outlet 40, and a second part selected from the first hose connection parts 2 is arranged such that the third fluid inlet 39 is in fluid communication with a second fluid outlet 41. Additionally, the hose connection 36 has four vapour recovery ports 42, 43, 44, 45. The fluid inlets 37, 38, 39 are arranged to receive a pipe for transporting fuel, the fluid outlets 40, 41 are arranged to receive a hose for transporting fuel, and the vapour recovery ports 42, 43, 44, 45 are arranged to receive a vapour recovery pipe for transporting fuel vapour.

FIG. 4d illustrates a hose connection 47 assembled using the kit of parts 1 according to a fourth embodiment of the invention. The hose connection 47 has a first, second and third fluid inlet 48, 49, 50 and a first fluid outlet 51. A first part selected from the third hose connection parts 4 is arranged such that the first, second third fluid inlets 48, 49, 50 are in fluid communication with the first fluid outlet 51. Additionally, the hose connection 47 has two vapour recovery ports 52, 53. The fluid inlets 48, 49, 50 are arranged to receive a pipe for transporting fuel, the fluid outlet 51 is arranged to receive a hose for transporting fuel, and the vapour recovery ports 52, 53 are arranged to receive a vapour recovery pipe for transporting fuel vapour.

In FIG. 4e, a hose connection 54 assembled using the kit of parts 1 according to a fifth embodiment of the invention is illustrated. The hose connection 54 has a first, second and third fluid inlet 55, 56, 57 and a second fluid outlet 58. A first part selected from the third hose connection parts 4 is arranged such that the first, second third fluid inlets 55, 56, 57 are in fluid communication with the second fluid outlet 58. Additionally, the hose connection 54 has two vapour recovery ports 59, 60. The fluid inlets 55, 56, 57 are arranged to receive a pipe for transporting fuel, the fluid outlet 58 is arranged to receive a hose for transporting fuel, and the vapour recovery ports 59, 60 are arranged to receive a vapour recovery pipe for transporting fuel vapour.

In a fuel dispensing unit having a plurality of hose connections assembled using the kit of parts 1 of the present invention, and equipped with vapour recovery ports as described above, the hose connections act as an interconnection part for a vapour recovery arrangement of the fuel dispensing unit. The fuel vapour can travel between the hose connections through pipes attached to the vapour recovery ports provided in each hose connection. Accordingly, the vapour recovery pipes from all hose connections of each side of the fuel dispensing unit are connected together using several T-joints. This is done, since the common solution is to only use only one vacuum source for all the vapour recovery pipes of each side of the fuel dispensing unit.

A fuel dispensing unit according to the present invention generally has four hose connections, two on each side of the fuel dispensing unit. Each hose connection connects a tube arrangement with at least one hose. As mentioned above, the tube arrangements and hoses are used for transporting fuel from an underground fuel reservoir to nozzles for refueling e.g. a motor vehicle. The tube arrangements extend from the underground fuel reservoir to an upper portion of the fuel dispensing unit. In the upper portion of the fuel dispensing unit, the tube arrangements are connected to the hoses by means of the hose connections. The tube arrangements are enclosed by compartments and columns of the fuel dispensing unit, and comprise one or several pipes which are attached to the inlets of the hose connections. The hoses are connected the outlets of the hose connections. The hoses extend from the hose connection in the upper portion of the fuel dispensing unit to a respective nozzle arranged in a nozzle boot placed on the side of the fuel dispensing unit.

The number of hose connections in a fuel dispensing unit varies in regard to the amount of hoses to be provided by the fuel dispensing unit. One hose connection is adapted to connect each tube arrangement, consisting of two or three pipes, with one or two hoses. The configuration of the hose connections is adapted to the type of tube arrangements used in the fuel dispensing unit, i.e. the number of pipes of the tube arrangement, together with the number of hoses provided by the fuel dispensing unit.

Figure 5:
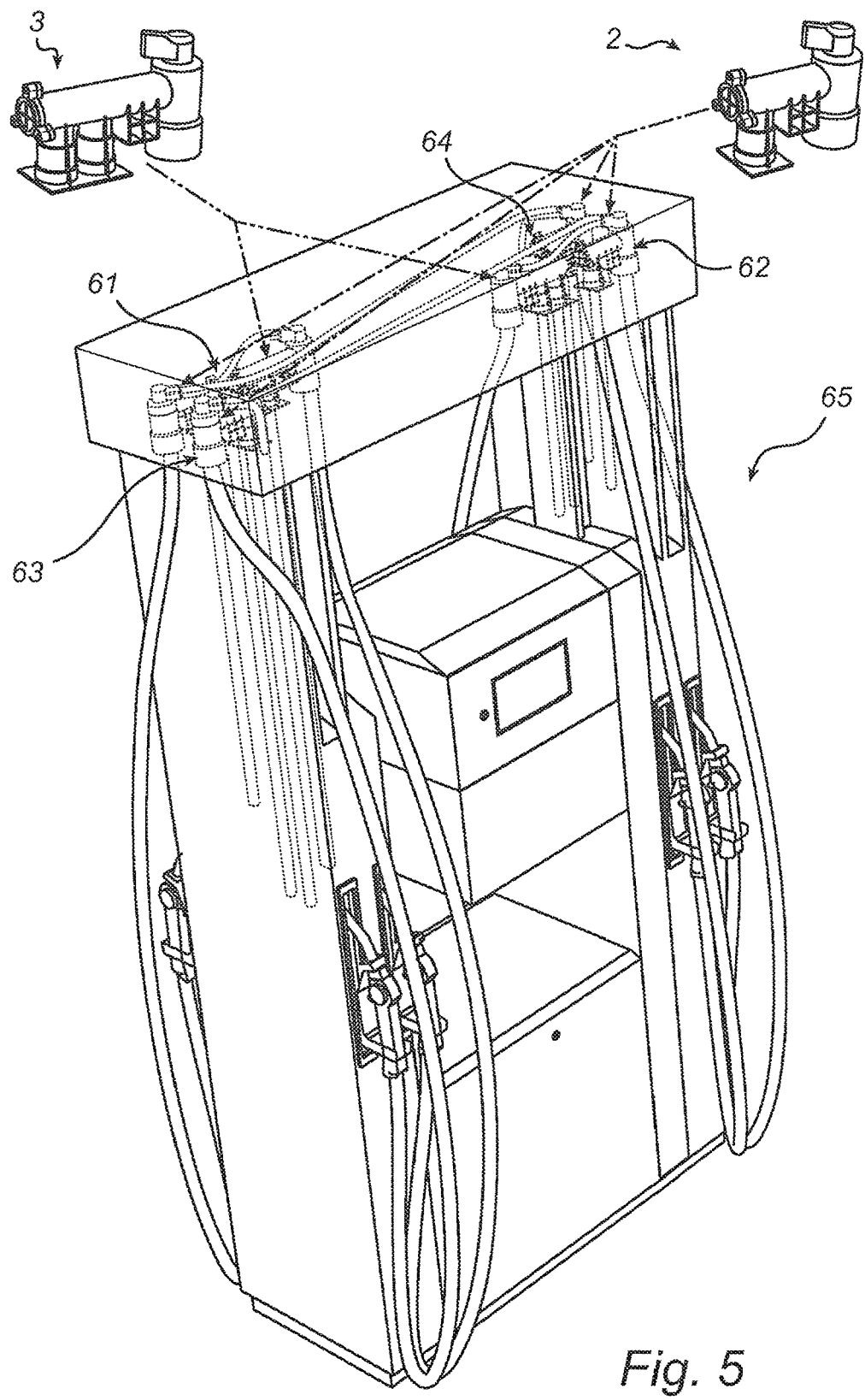
FIG. 5 is a perspective view of a fuel dispensing unit comprising hose connections assembled using the kit of parts illustrated in FIGS. 1-3.

In the embodiment illustrated in FIG. 5, four hose connections 61, 62, 63, 64 are used, two of which are assembled using the kit of parts 1. These two hose connections 61, 62 are assembled with a first hose connection part 2 and a second hose connection part 3, respectively. The other two hose connections are constituted by only a first hose connection part 2, respectively. Accordingly, the hose connections may also be constituted by only a first hose connection part 2 or a second hose connection part 3 of the kit of parts 1 according to the invention. Also, a fuel dispensing unit 65 according to the second aspect of the invention may be equipped with any combination of hose connections described above.

In the second and third hose connection parts 3, 4, blending of fuels with varying octane ratings within the hose connection parts 3, 4 is possible.

In the second hose connection part 3, blending of two different fuels with varying octane ratings is possible within the hose connection part 3. The two fuel types enter the hose connection part 3 through the fluid inlets 7, 8 and are blended within the hose connection part 3. The blended fuel is then ready for extraction through the fluid outlet 9 of the hose connection part 3.

In the third hose connection part 4, blending of three different fuels with varying octane ratings is possible within the hose connection part 4. The three fuel types enter the hose connection part 4 through the fluid inlets 10, 11, 12 and are mixed within the hose connection part 4. The blended fuel is then ready for extraction through the fluid outlet 13 of the hose connection part 4.

In one embodiment of the invention, the kit of parts 1 further comprises fastening elements for connecting the hose connections parts of the hose connection to each other. This will result in a reliable interconnection between the hose connection parts.

According to a second aspect of the invention a fuel dispensing unit is provided comprising a hose connection assembled with a kit of parts according to the above described features.

According to a third aspect of the invention a method for assembling a hose connection is provided using a kit of parts according to the above described features.

The invention has mainly been described above with reference to a few embodiments. However, as is readily appreciated by a person skilled in the art, other embodiments than the ones disclosed above are equally possible within the scope of the inventions, as defined by the appended claims.

What is claimed is:

1. A fuel dispensing unit, comprising:
   first and second fuel dispensing nozzles;
   a first hose connection part comprising a single fuel outlet and a single fuel inlet, the single fuel outlet being in fluid communication with the first dispensing nozzle and the single fuel inlet being in fluid communication with the single fuel outlet, the single fuel inlet and the single fuel outlet facing a first direction; and
   a second hose connection part comprising a single fuel outlet and a plurality of fuel inlets, the single fuel outlet being in fluid communication with the second dispensing nozzle and the plurality of fuel inlets being in communication with the single fuel outlet, the plurality of fuel inlets and the single fuel outlet facing the first direction;
   wherein the single fuel outlet of the first hose connection part is not in fluid communication with the single fuel outlet of the second hose connection part,
   wherein at least one of the first and second hose connection parts further comprises first and second vapor recovery ports.

2. The fuel dispensing unit of claim 1, wherein the second part includes a fluid pathway between the plurality of inlets and the single fuel outlet through which fuel entering the plurality of inlets flows so as to blend the fuel entering the plurality of inlets within the fluid pathway prior to the fuel flowing out the single fuel outlet of the second part and to the second fuel dispensing nozzle.

3. The fuel dispensing unit of claim 2, wherein the fluid pathway extends transverse to the openings.

4. The fuel dispensing unit of claim 1, wherein at least one of the first and second recovery ports are arranged to receive a vapor recovery pipe.

5. The fuel dispensing unit of claim 1, wherein the each vapor recovery port is coupled to a single vacuum source.

6. The fuel dispensing unit of claim 1, wherein each vapor recovery port is coupled to a vapor recovery pipe, and each vapor recovery pipe is connected together using at least one T-joint.

7. The fuel dispensing unit of claim 1, wherein the first and second hose connection parts are each mounted on a support surface of the fuel dispensing unit.

8. The fuel dispensing unit of claim 1, wherein the single fuel inlet of the first hose connection part is coupled to a pipe for transporting fuel, and the plurality of fuel inlets in the second hose connection part are each coupled to a pipe for transporting fuel.

9. The fuel dispensing unit of claim 8, wherein each pipe extends in a substantially vertical direction, perpendicular to a surface on which the fuel dispensing unit is placed.

* * * * *